US011634572B2

(12) United States Patent
Le Crom

(10) Patent No.: US 11,634,572 B2
(45) Date of Patent: Apr. 25, 2023

(54) COMPOSITION COMPRISING A COPOLYMER COMPRISING METHYL METHACRYLATE, (METH)ACRYLIC ACID AND STYRENE MONOMERS

(71) Applicant: Trinseo Europe GmbH, Horgen (CH)

(72) Inventor: Christophe Le Crom, Jurancon (FR)

(73) Assignee: TRINSEO EUROPE GMBH, Pfaeffikon (CH)

( * ) Notice: Subject to any disclaimer, the term of this patent is extended or adjusted under 35 U.S.C. 154(b) by 525 days.

(21) Appl. No.: 16/634,900

(22) PCT Filed: Jul. 27, 2018

(86) PCT No.: PCT/FR2018/051944
§ 371 (c)(1),
(2) Date: Jan. 29, 2020

(87) PCT Pub. No.: WO2019/025709
PCT Pub. Date: Feb. 7, 2019

(65) Prior Publication Data
US 2020/0277482 A1 Sep. 3, 2020

(30) Foreign Application Priority Data

Jul. 31, 2017 (FR) ..................................... 17 57288

(51) Int. Cl.
*C08L 25/14* (2006.01)
*B29C 45/00* (2006.01)
*C08F 220/06* (2006.01)
*C08F 220/14* (2006.01)

(52) U.S. Cl.
CPC .......... *C08L 25/14* (2013.01); *B29C 45/0001* (2013.01); *C08F 220/06* (2013.01); *C08F 220/14* (2013.01); *C08F 2438/02* (2013.01); *C08F 2800/20* (2013.01); *C08L 2201/08* (2013.01)

(58) Field of Classification Search
CPC .... C08F 212/08; C08F 220/14; C08F 220/06; C08F 2800/20
See application file for complete search history.

(56) References Cited

U.S. PATENT DOCUMENTS

| | | | |
|---|---|---|---|
| 2,199,557 A | 5/1940 | Charlton et al. | |
| 4,533,689 A * | 8/1985 | Tayama | B29C 39/16 526/272 |
| 4,558,098 A | 12/1985 | Kamata et al. | |
| 5,612,417 A | 3/1997 | Rhein et al. | |
| 6,071,980 A * | 6/2000 | Guan | C08F 2/48 522/27 |
| 6,100,355 A * | 8/2000 | Relvini | C08F 20/12 526/201 |
| 6,716,951 B2 | 4/2004 | Marutani et al. | |
| 2007/0222117 A1 | 9/2007 | Hoess et al. | |
| 2008/0261019 A1* | 10/2008 | Shen | C08J 9/0085 428/317.5 |

FOREIGN PATENT DOCUMENTS

| | | |
|---|---|---|
| CN | 101948601 | 1/2011 |
| EP | 0537767 A1 | 4/1993 |
| EP | 0774471 A1 | 5/1997 |
| EP | 2275461 | 1/2011 |
| GB | 531956 | 5/1938 |
| GB | 698193 | 10/1953 |
| GB | 1 437 176 | 5/1976 |
| JP | S58125712 A | 7/1983 |
| JP | H0243207 A | 2/1990 |
| JP | 2014111740 A | 6/2014 |
| WO | WO 04036112 A1 | 4/2004 |

OTHER PUBLICATIONS

Chinese Office Action for Chinese Application No. 201880049732. 6, dated Aug. 10, 2021 with translation, 18 pages.
Chinese Office Action for Chinese Application No. 201880049732. 6, dated Mar. 9, 2022, with translation, 14 pages.
Japanese Notice of Reasons for Rejection for Japanese Application No. 2020-503848, dated Jul. 12, 2022 with partial translation, 12 pages.
European Communication for European Application No. 18 765 946.1, dated Jun. 22, 2022, with translation, 8 pages.
Chinese Decision on Rejection for Chinese Application No. 201880049732.6, dated Sep. 15, 2022, with translation, 11 pages.

\* cited by examiner

*Primary Examiner* — Robert C Boyle
(74) *Attorney, Agent, or Firm* — RatnerPrestia

(57) ABSTRACT

The present invention relates to a polymer composition comprising a polymer comprising methyl methacrylate, (meth)acrylic acid and styrene monomers. In particular, the present invention relates to a polymer composition comprising a polymer comprising methyl methacrylate, (meth) acrylic acid and styrene monomers, said composition having particularly advantageous compromises of heat-resistant, fluidity, scratch-resistant and chemical-resistant properties. The present invention also relates to a molded or extruded object comprising a polymer comprising methyl methacrylate, (meth)acrylic acid and of styrene monomers, and the use of these objects.

10 Claims, No Drawings

US 11,634,572 B2

COMPOSITION COMPRISING A COPOLYMER COMPRISING METHYL METHACRYLATE, (METH)ACRYLIC ACID AND STYRENE MONOMERS

This application claims benefit, under U.S.C. §119 or §365 of PCT Application Number PCT/FR2018/051944, filed Jul. 27, 2018, and French Patent Applications Number FR17.57288, filed Jul. 31, 2017, these documents being incorporated herein by reference.

FIELD OF THE INVENTION

The present invention relates to a polymer composition comprising a polymer comprising monomers of methyl methacrylate, of (meth)acrylic acids and of styrene.

In particular, the present invention relates to a polymer composition comprising a polymer comprising monomers of methyl methacrylate, of (meth)acrylic acids and of styrene, said composition having particularly advantageous compromises of thermal resistance, flow, scratch resistance and chemical resistance.

The present invention also relates to a molded or extruded object comprising a polymer comprising monomers of methyl methacrylate, of (meth)acrylic acids and of styrene and also to the use of these objects.

Technical Problem

Thermoplastic polymers and copolymers, especially (meth)acrylic polymers, have excellent transparency characteristics, good mechanical and machining properties, and are widely used in various fields, such as motor vehicle parts, electrical parts, industrial parts, optical materials, various parts of household electrical appliances, esthetic parts, miscellaneous articles and the like.

It is very advantageous to have available polymer compositions based on (meth)acrylic polymers which have sufficient thermal properties in these fields or, in other words, an increased thermal resistance or an increased Vicat temperature. This may be obtained by copolymerization with specific comonomers.

Furthermore, it is also very advantageous to have a polymer composition that has better optical, thermal resistance, flow, scratch resistance and chemical resistance properties. All of these properties are however difficult to obtain at the same time and generally compromises are obtained which do not always meet the requirements necessary for certain applications.

The objective of the present invention is to provide a (meth)acrylic polymer composition having a better balance of properties.

Thus, one of the objectives of the invention is to provide a composition, the thermal resistance of which is improved, having a Vicat softening temperature above 110° C., preferably above 111° C.

Another of the objectives of the invention is to provide a composition, the flow of which is improved, having a melt flow index (MFI) of greater than 2.5 g/10 min, preferably greater than 3 g/10 min.

Another of the objectives of the invention is to provide a composition, the scratch resistance of which is improved.

Another of the objectives of the invention is to provide a composition, the chemical resistance of which is improved.

Another objective of the present invention is to provide an object, the thermal resistance, scratch resistance and chemical resistance of which are improved.

BACKGROUND OF THE INVENTION

Prior Art

Numerous documents describe polymer compositions comprising methacrylic monomers and monomers that make it possible to improve certain properties.

Document U.S. Pat. No. 6,716,951 describes a process for producing methacrylic polymers with improved thermal resistance comprising comonomers such as alpha-methylstyrene, styrene and maleic anhydride. alpha-Methylstyrene is a monomer which is not readily available on the market and therefore has a high cost, whereas maleic anhydride poses handling problems due to its toxicity.

Document U.S. Pat. No. 4,558,098 describes a very similar approach, which does not limit the styrenic monomer to alpha-methylstyrene by including the whole family of vinyl aromatic compounds.

Document US 2007222117 also describes a composition similar to the previous two, also with the use of maleic anhydride.

Document U.S. Pat. No. 5,612,417 describes a composition derived from a mixture of two polymers, one mainly consisting of methyl methacrylate (greater than 80%), the other consisting of methyl methacrylate (29% to 70%), styrene or alpha-methylstyrene (30% to 70%), and (meth)acrylic acids (1% to 20%). Although this mixture has properties which may prove to be advantageous, it has the disadvantage of requiring two polymers, each to be prepared separately, followed by a step of mixing these two polymers.

A similar approach is described in EP 0537767 involving 3 polymers.

Finally, in the case of less elaborate compositions, numerous documents describe combinations of monomers such as methyl methacrylate and methacrylic acid (GB 478323, GB 531956, GB 698 193, GB 1437176, EP 0774471).

Although these compositions make it possible to improve properties such as heat resistance and scratch resistance, the melt flow index is greatly affected and is detrimental to the conditions of molding or injection-molding in the molten state.

BRIEF DESCRIPTION OF THE INVENTION

The Applicant has discovered that a polymer composition suitable for the manufacture of molded or injection-molded objects, said polymer comprising monomers chosen from methyl methacrylate in weight proportions of between 85% and 92%, styrene in weight proportions of between 3% and 10%, acrylic and/or methacrylic acids in proportions of between 3% and 6%, makes it possible to obtain a (meth)acrylic copolymer having optical, thermal resistance, flow, scratch resistance and chemical resistance properties that are particularly optimal and suitable for the manufacture of molded or injection-molded objects. Furthermore, when the composition is polymerized according to a "controlled" protocol, the balance of the properties is improved. Said composition has a melt flow index of between 3.5 and 7 g/10 minutes and a Vicat softening temperature of between 110° C. and 120° C.

DETAILED DESCRIPTION OF THE INVENTION

The term "copolymer", as used, denotes polymers consisting of at least two different monomers. In the context of the invention, reference will be made without distinction to polymer or copolymer.

Thus, the copolymer incorporated into the composition of the invention comprises:
- methyl methacrylate in weight proportions varying from 85% to 92%, preferably between 88% and 92%, and more preferably between 88% and 91% and advantageously between 88% and 90%,
- styrene in weight proportions varying from 3% to 10%, preferably between 5% and 9%, and more preferably between 5.5% and 8% and advantageously between 6% and 8%,
- methacrylic acid and/or of acrylic acid in weight proportions varying from 3% to 6% and preferably between 3.5% and 5% and advantageously between 4% and 5%. Ideally methacrylic acid in proportions varying from 4% to 4.9%.

All the limits of these compositions being included.

The copolymer incorporated into the composition of the invention preferably consists of methyl methacrylate in weight proportions varying from 85% to 92%, preferably between 88% and 92%, and more preferably between 88% and 91% and advantageously between 88% and 90%; styrene in weight proportions varying from 3% to 10%, preferably between 5% and 9% and more preferably between 5.5% and 8% and advantageously between 6% and 8%; and methacrylic acid and/or acrylic acid in weight proportions varying from 3% to 6% and preferably between 3.5% and 5% and advantageously between 4% and 5%. Ideally methacrylic acid in proportions varying from 4% to 5%.

The copolymer incorporated into the composition of the invention has a melt flow index (MFI) of between 3.5 and 7 g/10 minutes, and preferably between 4 and 6.5 g/10 minutes, measured according to the standard ISO 1133-2:2011 (230° C./3.8 kg).

The copolymer incorporated into the composition of the invention has a Vicat softening temperature of between 110° C. and 120° C., measured at a load of 50 N according to the standard ISO 306:2013 method B50.

With regard to the process for manufacturing the polymer composition according to the invention, it comprises the steps of:
a) preparing a mixture comprising three monomers
  a1) of methyl methacrylate in weight proportions varying from 85% to 92%, preferably between 88% and 92%, and more preferably between 88% and 91% and advantageously between 88% and 90%,
  a2) of styrene in weight proportions varying from 3% to 10%, preferably between 5% and 9%, and more preferably between 5.5% and 8% and advantageously between 6% and 8%,
  a3) of methacrylic acid and/or of acrylic acid in weight proportions varying from 3% to 6% and preferably between 3.5% and 5% and advantageously between 4% and 5% and ideally of methacrylic acid in proportions varying from 4% to 4.9%,
  all the proportions being relative to the sum of the three monomers a1), a2) and a3),
b) polymerizing the mixture obtained in step a).

With regard to the preparation of the copolymers incorporated into the composition which is the subject of the invention, according to a first embodiment of the invention, the polymerization is carried out in a "conventional" radical manner using an initiator of free radical type.

The initiator is of azo, peroxide or hydroperoxide type.

Examples of the abovementioned radical initiator include azo compounds such as azobisisobutyronitrile, azobis(dimethyl)valeronitrile, azobis(cyclohexanenitrile), 1,1'-azobis(1-acetoxy-1-phenylethane), dimethyl 2,2'-azobisisobutyrate and 4,4'-azobis(4-cyanovaleric acid); and organic peroxides such as benzoyl peroxide, lauroyl peroxide, acetyl peroxide, caprylyl peroxide, 2,4-dichlorobenzoyl peroxide, isobutyl peroxide, acetylcyclohexylsulfonyl peroxide, tert-butyl peroxypivalate, tert-butyl peroxy-2-ethylhexanoate, 1,1-di(tert-butylperoxy)cyclohexane, 1,1-di(tert-butylperoxy)-3,3,5-trimethylcyclohexane, 1,1-di(tert-hexylperoxy)-3,3,5-trimethylcyclohexane, isopropyl peroxydicarbonate, isobutyl peroxydicarbonate, sec-butyl peroxydicarbonate, n-butyl peroxydicarbonate, 2-ethylhexyl peroxydicarbonate, bis(4-tert-butylcyclohexyl)peroxydicarbonate, tert-amyl peroxy-2-ethylhexanoate, 1,1,3,3-tetramethylbutyl peroxyethylhexanoate, 1,1,2-trimethylpropyl peroxy-2-ethylhexanoate, tert-butylperoxy isopropyl monocarbonate, tert-amylperoxy isopropyl monocarbonate, tert-butylperoxy 2-ethylhexyl carbonate, tert-butylperoxy allyl carbonate, tert-butylperoxy isopropyl carbonate, 1,1,3,3-tetramethylbutylperoxy isopropyl monocarbonate, 1,1,2-trimethylpropylperoxy isopropyl monocarbonate, 1,1,3,3-tetramethylbutyl peroxyisononanoate, 1,1,2-trimethylpropyl peroxyisononanoate, 1,1-bis(tert-amylperoxy)cyclohexane and tert-butyl peroxybenzoate. These radical initiators can be used individually as one type or can be used as a mixture of two or more types thereof.

The amount of the radical initiator to be used is not particularly limited, and can be from 0.001 percent by weight to 1 percent by weight relative to the mixture of monomers.

As regards the chain transfer agent or the chain regulator of the process for manufacturing the composition according to the invention, it is a sulfur-containing organic compound, in order to adjust the molecular weight of the polymer produced by the process.

The chain transfer agent is chosen from mercaptans.

The chain transfer agent may be a monofunctional or multifunctional chain transfer agent, and specific examples thereof, alone or as a mixture, include alkyl mercaptans such as propyl mercaptan, butyl mercaptan, hexyl mercaptan, octyl mercaptan, 2-ethylhexyl mercaptan and dodecyl mercaptan; aromatic mercaptans such as phenyl mercaptan and thiocresol; mercaptans with a carbon number of 18 or less such as ethylene thioglycol; polyhydric alcohols such as ethylene glycol, neopentyl glycol, trimethylolpropane, pentaerythritol, dipentaerythritol, tripentaerythritol and sorbitol; substances esterified from a hydroxyl group with thioglycolic acid or 3-mercaptopropionic acid, 1,4-dihydronaphthalene, 1,4,5,8-tetrahydronaphthalene; terpinene, terpinolene, 1,4-cyclohexadiene, 1,4-cyclohexadiene and hydrogen sulfide. These may be used in the form of a single substance or as a combination of two or more types.

The amount of chain transfer agent is not particularly limited and varies depending on the type of chain transfer agent used. For example, in the case of using mercaptans as a chain transfer agent, the amount is preferably from 0.01 part by weight to 3 parts by weight, more preferably from 0.05 part by weight to 1 part by weight, relative to 100 parts by weight of the mixture of monomers.

According to a second embodiment of the invention, the polymerization is carried out in a controlled radical manner.

One of the distinctive features of controlled radical polymerization (CRP) concerns the rate of initiation corresponding to the dormant chemical species that generate the propagating species which is much faster than the rate of propagation of chain polymerization. All the chains are therefore initiated at the start of the polymerization and the propagation continues as long as monomers remain.

In "conventional" uncontrolled radical polymerization, it is the opposite, the initiation rate is slower than the propagation rate. In this case new chains are created throughout the polymerization.

Thus, in CRP, the dispersity of the polymer obtained is lower, but particularly in CRP all the chains have the same monomer composition, irrespective of the reactivity ratios of the monomers. This favorably affects the compromise of properties.

Use could be made of any type of controlled radical polymerization in the context of the invention such as NMP ("Nitroxide Mediated Polymerization"), RAFT ("Reversible Addition and Fragmentation Transfer"), ATRP ("Atom Transfer Radical Polymerization"), INIFERTER ("Initiator-Transfer-Termination"), RITP ("Reverse Iodine Transfer Polymerization") or ITP ("Iodine Transfer Polymerization").

According to a preferred embodiment of the invention, the copolymers are prepared by nitroxide-mediated polymerization (NMP).

More particularly, the nitroxides resulting from the alkoxyamines derived from the stable free radical (1) are preferred.

(1)

in which the radical $R_L$ has a molar mass of greater than 15.0342 g/mol. The radical $R_L$ may be a halogen atom such as chlorine, bromine or iodine, a saturated or unsaturated, linear, branched or cyclic, hydrocarbon-based group, such as an alkyl or phenyl radical, or an ester group —COOR or an alkoxyl group —OR or a phosphonate group —PO(OR)$_2$, as long as it has a molar mass greater than 15.0342. The radical $R_L$, which is monovalent, is said to be in the β position with respect to the nitrogen atom of the nitroxide radical. The remaining valences of the carbon atom and of the nitrogen atom in formula (1) can be bonded to various radicals, such as a hydrogen atom or a hydrocarbon-based radical, for instance an alkyl, aryl or arylalkyl radical, comprising from 1 to 10 carbon atoms. It is not excluded for the carbon atom and the nitrogen atom in formula (1) to be connected together via a divalent radical, so as to form a ring. Preferably, however, the remaining valences of the carbon atom and of the nitrogen atom of formula (1) are bonded to monovalent radicals. Preferably, the radical $R_L$ has a molar mass of greater than 30 g/mol. The radical $R_L$ may, for example, have a molar mass of between 40 and 450 g/mol. By way of example, the radical $R_L$ may be a radical comprising a phosphoryl group, it being possible for said radical $R_L$ to be represented by the formula (2):

(2)

in which $R^1$ and $R^2$, which may be identical or different, may be chosen from alkyl, cycloalkyl, alkoxyl, aryloxyl, aryl, aralkyloxyl, perfluoroalkyl or aralkyl radicals and may comprise from 1 to 20 carbon atoms. $R^1$ and/or $R^2$ may also be a halogen atom such as a chlorine or bromine or fluorine or iodine atom. The radical $R_L$ may also comprise at least one aromatic ring, such as for the phenyl radical or the naphthyl radical, it being possible for said ring to be substituted, for example with an alkyl radical comprising from 1 to 4 carbon atoms.

More particularly, the alkoxyamines derived from the following stable radicals are preferred:

N-(tert-butyl)-1-phenyl-2-methylpropyl nitroxide,
N-(tert-butyl)-1-(2-naphthyl)-2-methylpropyl nitroxide,
N-(tert-butyl)-1-diethylphosphono-2,2-dimethyl propyl nitroxide,
N-(tert-butyl)-1-dibenzylphosphono-2,2-dimethylpropyl nitroxide,
N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphono-1-methylethyl nitroxide,
4-oxo-2,2,6,6-tetramethyl-1-piperidinyloxy,
2,4,6-tri-tert-butylphenoxy nitroxide,
N-(tert-butyl)-1-diethylphosphono-2,2-dimethylpropyl nitroxide.

The alkoxyamines used in controlled radical polymerization must allow good control of the linking of the monomers. Thus, they do not all allow good control of certain monomers. For example, the alkoxyamines derived from TEMPO make it possible to control only a limited number of monomers; the same is true for the alkoxyamines derived from 2,2,5-trimethyl-4-phenyl-3-azahexane-3-nitroxide (TIPNO). On the other hand, other alkoxyamines derived from nitroxides corresponding to formula (1), particularly those derived from nitroxides corresponding to formula (2) and even more particularly those derived from N-(tert-butyl)-1-diethylphosphono-2,2-dimethyl propyl nitroxide, make it possible to broaden the controlled radical polymerization of these monomers to a large number of monomers.

In addition, the alkoxyamine opening temperature also influences the economic factor. The use of low temperatures will be preferred in order to minimize industrial difficulties. The alkoxyamines derived from nitroxides corresponding to formula (1), particularly those derived from nitroxides corresponding to formula (2) and even more particularly those derived from N-(tert-butyl)-1-diethylphosphono-2,2-dimethylpropyl nitroxide, will therefore be preferred to those derived from TEMPO or 2,2,5-trimethyl-4-phenyl-3-azahexane-3-nitroxide (TIPNO).

A heat stabilizer for suppressing the thermal decomposition of the (meth)acrylic copolymer can be added with the other raw materials, in particular the mixture of monomers, in the process. More preferably, the content of heat stabilizer is between 1 ppm and 2000 ppm by weight relative to the total amount of the final methacrylic copolymer composition obtained by the process. When the methacrylic resin composition of the present invention is subjected to injection molding in order to mold it into a light guide plate as desired, a molding temperature is set at a higher temperature for the purpose of increasing a molding efficiency in some cases, and the addition of the heat stabilizer in these cases contributes to such an effect.

With regard to the heat stabilizer, there are no specific limitations, but a phosphorus-based heat stabilizer and an organic disulfide compound are mentioned by way of example. Among them, the organic disulfide compound is preferred. As heat stabilizer, one type or more than one type thereof can be used.

As the phosphorus-based heat stabilizer described above, examples are tris(2,4-di-t-butylphenyl)phosphite, 2-[[2,4,8,10-terakis(1,1-dimethylethyl)dibenzo[d,f][1,3,2]dioxaphosphepin-6-yl]oxy]-N,N-bis[2-[[2,4,8,10-tetrakis (1,1-dimethylethyl)dibenzo[d,f][1,3,2]dioxaphosphepin-6-yl]oxy] ethyl] ethanamine, diphenyl tridecyl phosphite, triphenyl phosphite, 2,2-methylenebis(4,6-di-tert-butylphenyl)octyl phosphite, bis(2,6-di-tert-butyl-4-methylphenyl)pentaerythritol diphosphite, etc. Among them, 2,2-methylenebis(4,6-di-tert-butylphenyl)octyl phosphite is preferred.

As the organic disulfide compound described above, examples are dimethyl disulfide, diethyl disulfide, di-n-propyl disulfide, di-n-butyl disulfide, di-sec-butyl disulfide, di-tert-butyl disulfide, di-tert-amyl disulfide, dicyclohexyl disulfide, di-tert-octyl disulfide, di-n-dodecyl disulfide, di-tert-dodecyl disulfide, etc. Among them, di-tert-alkyl disulfide is preferred, and di-tert-dodecyl disulfide is more preferred.

Generally, the polymerization is carried out in the absence of any intentionally added solvent or dispersant. The liquid monomers of the monomer mixture are not considered to be added solvents or dispersants. When the polymerization experiences incomplete conversion of the monomers, these monomers will be able to be removed by evaporation in a suitable device.

According to another aspect, the present invention relates to the use of the composition for the manufacture of a molded or extruded object.

According to another aspect, the present invention relates to a process for manufacturing a molded or extruded object by transformation of a polymer composition obtained by the process for preparing a polymer composition suitable for the manufacture of molded or extruded objects.

The transformation can be carried out by injection molding, extrusion, coextrusion or extrusion/blow molding. Preferably, the transformation is carried out by injection or extrusion, and more preferably by injection molding.

The process for manufacturing a molded object according to the invention comprises the following steps:
melting the composition comprising a (meth)acrylic copolymer produced by the process of the present invention,
injecting the molten composition into a mold,
applying pressure to the mold at least until the mold is completely filled with the molten composition.

According to another aspect, the present invention relates to the use of the composition for manufacturing a molded object, said polymer composition being obtained by the process for preparing a polymer composition suitable for the manufacture of molded objects or articles.

The polymer composition produced by the process of the present invention is preferably used as material for a molded article, and the molded article obtained therefrom has the advantage of having a high heat resistance and a high thermal stability. For example, the polymer composition produced by the process of the present invention (more specifically, the methacrylic copolymer composition after release of the volatile materials) is molded alone or together with any one or more other suitable components according to any molding process, such as injection molding and extrusion molding in order to prepare a molded article.

The composition according to the invention can be transformed by injection molding, extrusion, co-extrusion or extrusion/blow molding for the preparation of parts, profiled elements, sheets or films, for example, or for the production of a molded object or article.

The composition obtained by the process according to the invention can be used for the manufacture of an article or be used to form part of an article.

The composition obtained by the process according to the invention can be used in order to be transformed directly into an article or an object or can be part of an article or an object.

According to another aspect, the present invention relates to a molded or extruded object manufactured from a polymer composition obtained by a process according to the present invention.

The molded or extruded object of the invention may be in the form of a sheet, a block, a film, a tube or a profiled element.

Examples of molded or extruded objects or articles are light guides, lenses, decorative motor vehicle parts, front and rear motor vehicle headlamp parts, tail light, lamp covers, dashboard windows, aggregates, oven facades, parts of household appliances, optical films, decorative films, upper protective layers of coextruded multilayer structures.

EXAMPLES

The series of examples relates to the preparation of copolymers of various compositions.

Example 1

A copolymer COPO1 is prepared by suspension polymerization according to document EP0774471 example 4, using a mixture comprising 95.5% by weight of methyl methacrylate, 4.5% by weight of methacrylic acid, the two monomers together representing 100 parts by weight, and 0.26 part by weight of a chain regulator, 0.005 part by weight of DTDDS and, as the last ingredient, 0.225 part by weight of t-butyl peroxy-2-ethylhexanoate (Luperox® 26 from Arkema).

Example 2

A copolymer COPO2 is prepared by suspension polymerization according to document EP0774471 example 4, using a mixture comprising 88.5% by weight of methyl methacrylate (MMA), 4.5% by weight of methacrylic acid (MAA), and 7% of styrene (STY), the three monomers together representing 100 parts by weight, and 0.26 part by weight of a chain regulator, 0.005 part by weight of DTDDS and, as the last ingredient, 0.225 part by weight of t-butyl peroxy-2-ethylhexanoate (Luperox® 26 from Arkema).

TABLE 1 comparison of the flow and Vicat properties of the compositions COPO1 and COPO2

|  | MMA | STY | MAA | MFI (g/10 min) | Vicat ° C. |
| --- | --- | --- | --- | --- | --- |
| COPO1 | 95.5 | 0 | 4.5 | 2 | 121 |
| COPO2 | 88.5 | 7 | 4.5 | 5.2 | 117 |

Although a slight decrease in the Vicat temperature is noted owing to the presence of styrene in COPO2, on the other hand the melt flow index is greatly increased, which represents a particularly beneficial advantage during the molding of complex parts.

The invention claimed is:
1. A polymer composition suitable for the manufacture of molded or injection-molded, or extruded objects, said poly- mer comprising methyl methacrylate monomer units in weight proportions of between 88% and 90%, styrene monomer units in weight proportions of between 5.5% and 8%, acrylic and/or methacrylic acid monomer units in proportions of between 3.5% and 5%, wherein the composition has the properties:
- a melt flow index of between 4 and 7 g/10 minutes, measured according to the standard ISO 1133-2:2011 at 230° C. and 3.8 kg load;
- a Vicat softening temperature of between 110° C. and 120° C., measured at a load of 50 N according to the standard ISO 306:2013 method B50.

2. The composition as claimed in claim 1, prepared by radical polymerization.

3. The composition as claimed in claim 1, prepared by controlled radical polymerization.

4. The composition as claimed in claim 1, having a melt flow index of between 4 and 6.5 g/10 minutes.

5. A process for preparing a polymer composition as claimed in claim 1, comprising the steps of:
- a) preparing a mixture comprising three monomers
  - a1) of methyl methacrylate in weight proportions varying from 8% to 90%,
  - a2) of styrene in weight proportions varying from 3.5% to 8%,
  - a3) of methacrylic acid and/or of acrylic acid in weight proportions varying from 3.5% to 5% all the proportions being relative to the sum of the three monomers a1), a2) and a3),
- b) polymerizing the mixture obtained in step a).

6. The process as claimed in claim 5, wherein the polymerization is carried out by radical polymerization.

7. The process as claimed in claim 5, wherein the polymerization is carried out by controlled radical polymerization.

8. A molded or extruded object manufactured from a composition as claimed in claim 1.

9. The object as claimed in claim 8, in the form of a sheet, a block, a film, a tube or a profiled element.

10. The object as claimed in claim 8, selected from the group consisting of light guides, lenses, decorative motor vehicle parts, front and rear motor vehicle headlamp parts, tail light, lamp covers, dashboard windows, aggregates, oven facades, parts of household appliances, optical films, decorative films, upper protective layers of coextruded multilayer structures.

* * * * *

UNITED STATES PATENT AND TRADEMARK OFFICE
CERTIFICATE OF CORRECTION

| | | |
|---|---|---|
| PATENT NO. | : 11,634,572 B2 | Page 1 of 1 |
| APPLICATION NO. | : 16/634900 | |
| DATED | : April 25, 2023 | |
| INVENTOR(S) | : Christophe Le Crom | |

It is certified that error appears in the above-identified patent and that said Letters Patent is hereby corrected as shown below:

In the Claims

At Column 9, Claim 5, Line 23, 8% should read --88%--

Signed and Sealed this
Fourth Day of July, 2023

Katherine Kelly Vidal
*Director of the United States Patent and Trademark Office*